(12) United States Patent
Northrup et al.

(10) Patent No.: US 6,836,028 B2
(45) Date of Patent: Dec. 28, 2004

(54) SEGMENTED ARC GENERATOR

(75) Inventors: G. William Northrup, Ellicottville, NY (US); Jimmie Joe Cathey, Lexington, KY (US); Lawrence Hoyt, Shelbyville, KY (US)

(73) Assignee: Frontier Engineer Products, Ellicottville, NY (US)

( * ) Notice: Subject to any disclaimer, the term of this patent is extended or adjusted under 35 U.S.C. 154(b) by 135 days.

(21) Appl. No.: 10/282,522

(22) Filed: Oct. 29, 2002

(65) Prior Publication Data
US 2003/0137149 A1 Jul. 24, 2003

Related U.S. Application Data

(60) Provisional application No. 60/351,275, filed on Oct. 29, 2001, and provisional application No. 60/352,108, filed on Jan. 25, 2002.

(51) Int. Cl.[7] ............................................. F03D 9/00
(52) U.S. Cl. ...................... 290/44; 290/55; 310/155; 310/168
(58) Field of Search ................... 290/44, 55; 310/155, 310/169

(56) References Cited

U.S. PATENT DOCUMENTS

| | | | | |
|---|---|---|---|---|
| 1,233,232 A | * | 7/1917 | Heyroth | 290/55 |
| 1,352,960 A | * | 9/1920 | Heyroth | 290/44 |
| 1,783,669 A | | 12/1930 | Oliver | 415/4.5 |
| 1,944,239 A | * | 1/1934 | Hermann | 290/55 |
| 3,740,565 A | | 6/1973 | Wesley | 180/2.2 |
| 3,878,913 A | | 4/1975 | Lionts et al. | 290/55 |
| 3,883,750 A | | 5/1975 | Uzzell, Jr. | 290/55 |
| 3,983,430 A | * | 9/1976 | Howard | 310/155 |
| 4,075,500 A | | 2/1978 | Oman et al. | 290/55 |
| 4,289,970 A | * | 9/1981 | Deibert | 290/44 |
| 4,320,304 A | | 3/1982 | Karlsson et al. | 290/55 |
| 4,324,985 A | | 4/1982 | Oman | 290/55 |
| 4,423,368 A | | 12/1983 | Bussiere | 240/55 |

(List continued on next page.)

FOREIGN PATENT DOCUMENTS

EP 128099 A2 * 12/1984 .......... H02K/19/10

Primary Examiner—Joseph Waks
(74) Attorney, Agent, or Firm—Watts Hoffman Co.

(57) ABSTRACT

A segmented arc generator is adapted to convert mechanical power such as wind or water power into electrical power at a wide range of wind or shaft speeds. A rotor has a plurality of salient poles disposed about a periphery of a rotor ring. A stator has a stator ring disposed radially about and in close proximity to the rotor ring. The stator ring includes a plurality of stator coils wound on a ferromagnetic structure and having permanent magnets imbedded within the structure. Relative motion between a rotor pole and a corresponding stator coil induces a coil voltage across that coil. A phase controlled converter in electrical communication with the stator coils rectifies the output voltage. A pulse width modulated inverter is in electrical communication with the phase controlled converter for converting the D.C. voltage output by the phase controlled converter to an A.C. voltage of controlled amplitude and phase relationship determined with respect to a voltage waveform present on a connected utility grid. A switching matrix selectively places the coils in series or parallel or a combination of series and parallel connections with respect to one another in response to control signals that are based on present operating conditions of the generator. A boost converter circuit provides and maintains a minimum D.C. voltage to the pulse width modulated inverter when the voltage induced in the coils falls below a threshold value.

13 Claims, 8 Drawing Sheets

U.S. PATENT DOCUMENTS

| | | | | |
|---|---|---|---|---|
| 4,639,626 A | * | 1/1987 | McGee | 310/155 |
| 4,651,017 A | | 3/1987 | Longrigg | 290/44 |
| 4,748,339 A | | 5/1988 | Jamieson | 290/55 |
| 5,083,039 A | | 1/1992 | Richardson et al. | 290/55 |
| 5,289,041 A | | 2/1994 | Holley | 290/44 |
| 5,300,817 A | | 4/1994 | Baird | 290/55 |
| 5,315,159 A | * | 5/1994 | Gribnau | 290/55 |
| 5,381,048 A | | 1/1995 | Baird | 290/55 |
| 5,664,418 A | | 9/1997 | Walters | 60/398 |
| 6,064,123 A | * | 5/2000 | Gislason | 290/55 |

* cited by examiner

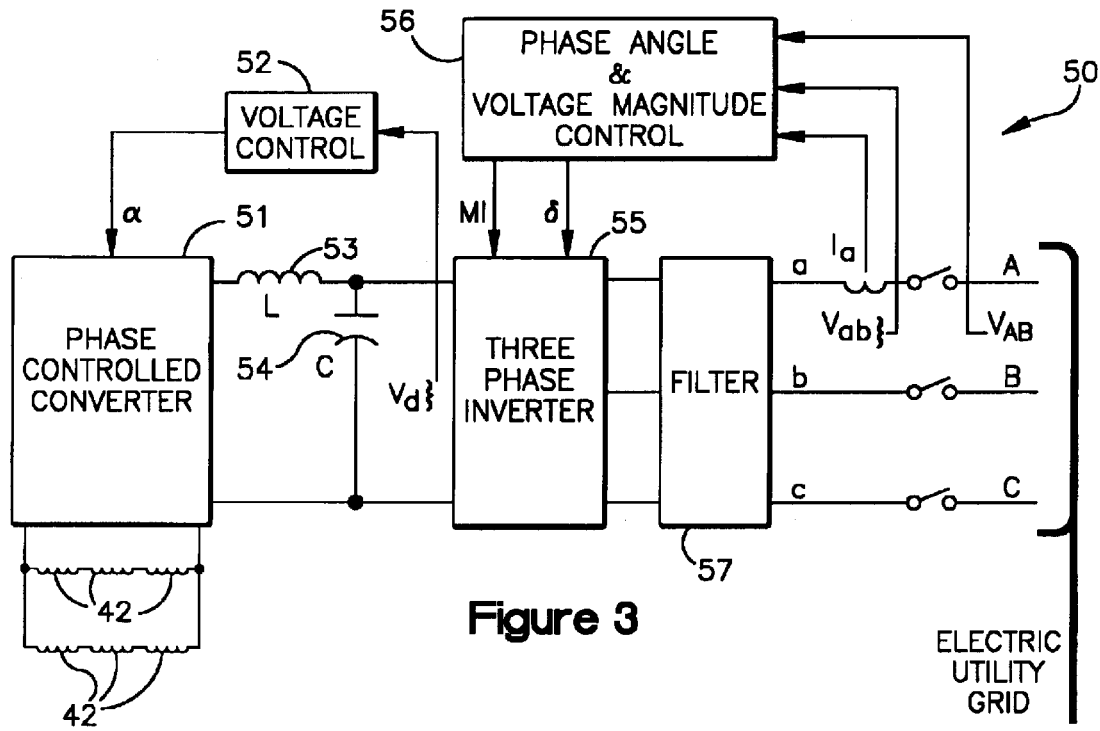
Figure 3
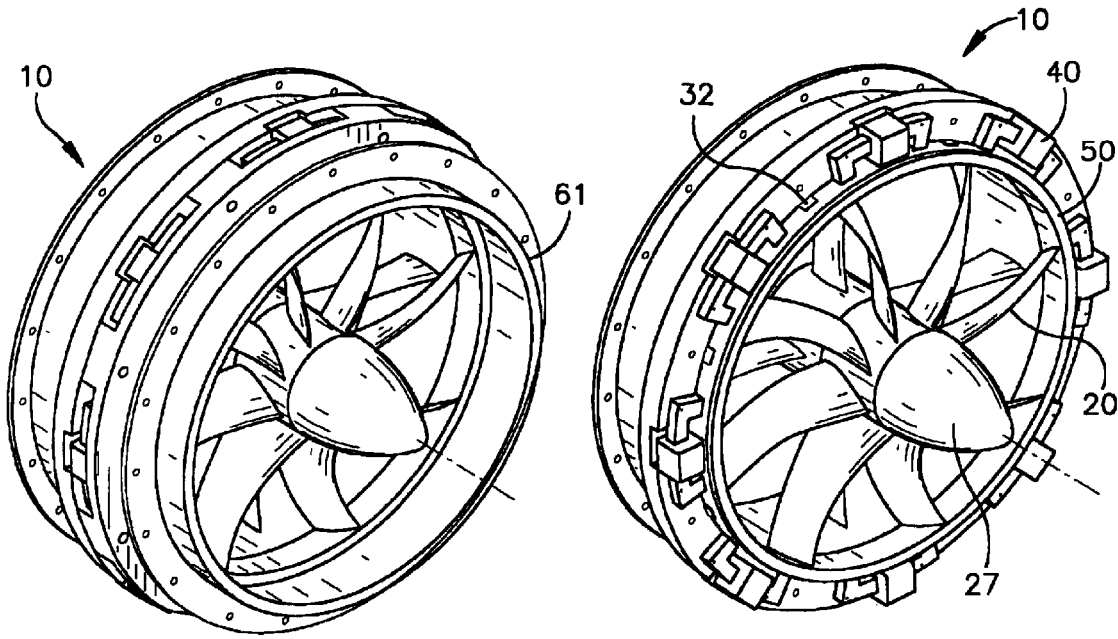
Figure 5                          Figure 6

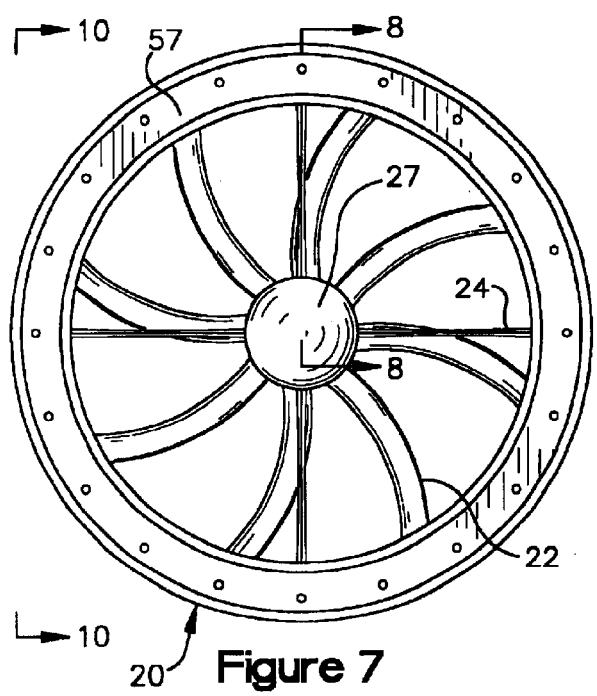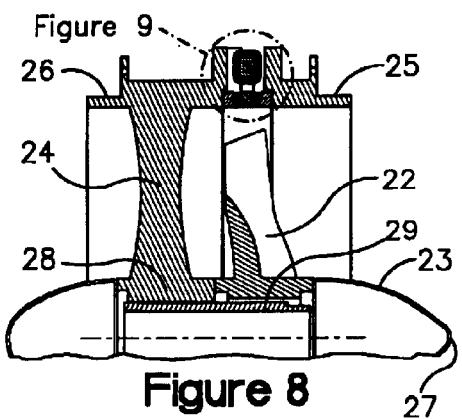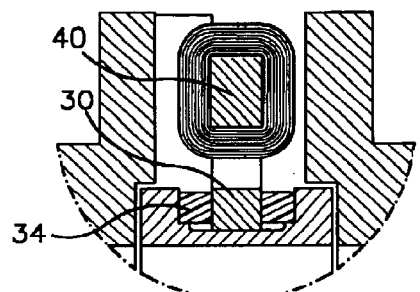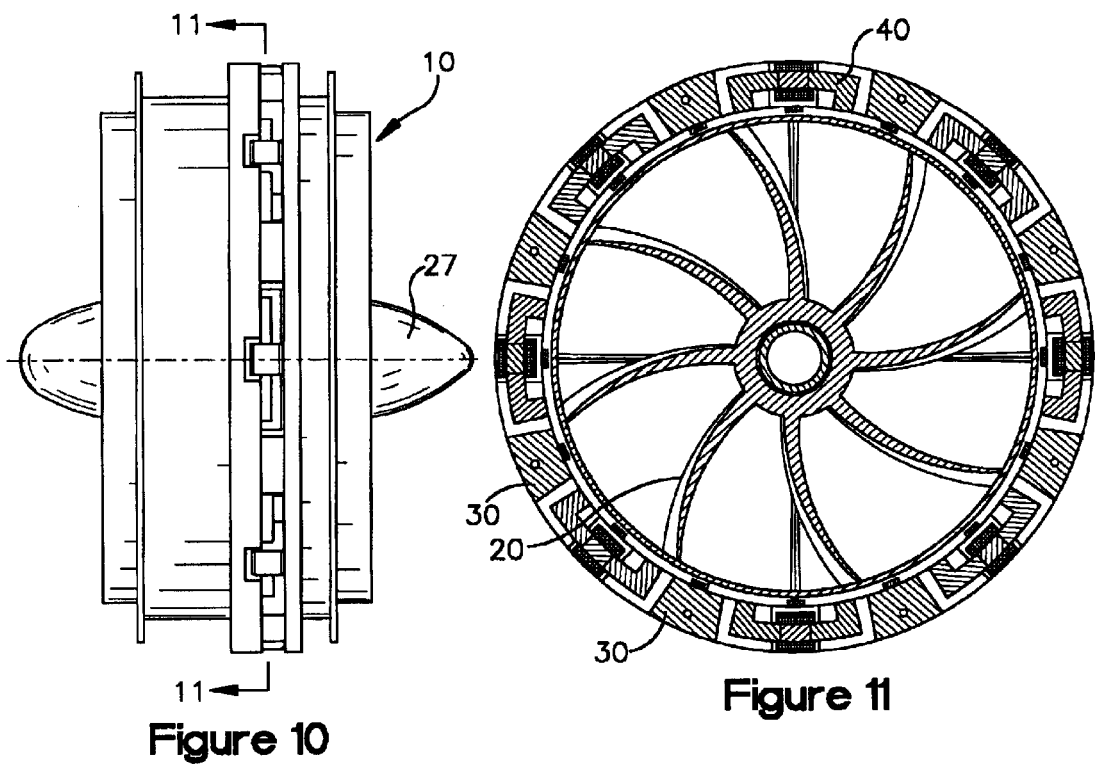

SEGMENTED ARC GENERATOR

The new application being transmitted claims the benefit of prior U.S. provisional application(s): 60/351,275 Oct. 29. 2001 No. 60/352,108 Jan. 25. 2002.

TECHNICAL FIELD

The invention relates generally to the field of electric power generation and more specifically to the field of wind generated electric power.

BACKGROUND OF THE INVENTION

The world wind electric potential has not been tapped before because wind turbine-technology was not able to utilize this resource. However, during the past decade, increased knowledge of wind turbine behavior has led to more cost-effective wind turbines that are more efficient in producing electricity. The price of the electricity produced from wind by these advanced turbines is estimated to be competitive with conventional sources of power, including fossil fuels. Because of the increasing competitiveness of wind energy, wind resource assessment will become essential in incorporating wind energy into the nation's energy mix.

Detailed wind resource assessments have been proposed or are being considered as part of a plan to increase the use of wind energy in Europe, Asia, Latin America, and other regions. The decreasing cost of wind power and the growing interest in renewable energy sources should ensure that wind power will become a viable energy source in the United States and worldwide.

The United States has tremendous wind energy resources. Although California gave birth to the modern U.S. wind industry, 16 states have greater wind potential. Installed wind energy generating capacity totaled 2,550 MW in 2000 and generated about 5.5 billion kWh of electricity—less than 1% of U.S. electricity generation. By contrast, the total amount of electricity that could potentially be generated from wind in the United States has been estimated at 10,777 billion kWh annually—three times the electricity generated in the U.S. today.

The American wind energy industry is poised for rapid growth in 2001. At least 40 projects in 20 states are proposed to come online, boosting U.S. wind energy capacity by 2,000 MW to 4,500 MW. These new wind farms demonstrate how wind energy can help meet the growing need for affordable, reliable power in the West and other regions of the United States.

SUMMARY OF THE INVENTION

By adjusting the connections between stator coils between series and parallel connection based on present operating conditions, a generator can operate effectively at a wide range of shaft speeds. Boost circuitry can further enhance the performance of the generator at low shaft speeds.

A segmented arc generator is adapted to convert mechanical power such as wind or water power into electrical power. A rotor is provided having a plurality of salient poles disposed about a periphery of a rotor ring that features a support structure for maintaining the radial position of the salient poles when the rotor rotates as a result of being driven by a prime mover. A stator is provided having a stator ring disposed radially about and in close proximity to the rotor ring. The stator ring includes a plurality of stator coils wound on a ferromagnetic structure and having permanent magnets imbedded within the structure. Relative motion between a rotor pole and a corresponding stator coil induces a coil voltage across that coil. A phase controlled converter in electrical communication with the stator coils rectifies the output voltage of the coil by passing a variable portion of the coil voltage to approximate a D.C. voltage. A voltage controller monitors the D.C. voltage and controls the phase controlled converter to pass a portion of the coil voltage that maintains a relatively constant D.C. voltage. A pulse width modulated inverter is in electrical communication with the phase controlled converter for converting the D.C. voltage output of the phase controlled converter to an A.C. voltage of controlled amplitude and phase relationship determined with respect to a voltage waveform present on a connected utility grid. A switching matrix selectively places the coils in series or parallel or a combination of series and parallel connections with respect to one another in response to control signals that are based on present operating conditions of the generator.

According to a preferred embodiment, a boost converter circuit provides and maintains a minimum D.C. voltage to the pulse width modulated inverter when the voltage induced in the coils falls below a threshold value. The boost converter circuit includes a storage device that is activated by a switch to selectively store and discharge energy to the pulse width modulated inverter. According to one embodiment, the boost converter circuit features an inductor connected in series with the output of the phase controlled converter, a transistor connected by its collector to the inductor and by its base to ground, and a diode connected between the collector and the input of the pulse width modulated inverter. The voltage controller provides gate voltage pulses to the transistor of controlled duration when the D.C. voltage falls below a predetermined level to periodically charge and discharge the inductor to supply a D.C. voltage of increased magnitude to the pulse width modulated inverter.

In one embodiment, the switching matrix removes stator coils from operation based on generator operating conditions. The rotor support structure can include integrally formed fan blades that rotate when acted upon by the wind to rotate the rotor within the stator or the prime mover may alternatively be a fan driven shaft. A plurality of rotor and stator pairs can be used together to increase output power.

BRIEF DESCRIPTION OF THE DRAWINGS

FIG. 3 is a schematic of a power conditioning circuit for the segmented arc generator of FIG. 1;

FIG. 5 is a perspective view of an arc segmented generator module assembly constructed in accordance with an embodiment of the present invention;

FIG. 6 is a perspective view of an arc segmented generator module assembly constructed in accordance with an embodiment of the present invention;

FIG. 7 is a front elevation view of an arc segmented generator module assembly constructed in accordance with an embodiment of the present invention;

FIG. 8 is a sectional view taken across line 8—8 of FIG. 7;

FIG. 9 is a detailed view of FIG. 8;

FIG. 10 is a front elevation view of a rotor bearing assembly for use in a segmented arc generator constructed in accordance with an embodiment of the present invention;

FIG. 11 is a front elevation view of a rotor bearing assembly for use in a segmented arc generator constructed in accordance with an embodiment of the present invention;

DESCRIPTION OF THE PREFERRED EMBODIMENTS

The present invention concerns a turbo-fan style wind power generation machine. The concept is to generate power from wind by utilizing some of the same design features as are used in ducted-fan engine construction. The generation machine will have a lower life cycle cost than the existing technology, in addition to being quieter and less intrusive in the environment.

The generation machine accelerates airflow into a contained ducted-fan and modularizes and locates a stator coil assembly about the fan outer diameter creating a segmented arc generator. Upon high wind events, the windmill will rotate 90 degrees to eliminate excess windmill structural stresses.

Air flow entering into the ducted-fan "wind collector" utilizes a venturi design to compress and accelerate air flow. The size and shape of the venturi design to process both the air flow and the number of blades and blade camber optimization has been determined through 3-D analytical analysis and wind tunnel demonstration. Blades are secured to an outer ring providing circumferential support and housing a discreet number of generator rotor poles. The electrical stator coil and magnet are modularized and are distributed circumferentially around the fixed outer case assembly. The number of segmented arc modules is determined by a cost/benefit analysis. As wind speed increases, an electrical control system will proportionally energize the segmented arc generator modules in unison while filtering the output to provide both reactive and average power.

Segmented Arc Generator and Controls

The power rating (P) of a rotary electric machine is described by $$P = k\frac{\pi}{4}D^2 l \omega_m = \frac{k}{2}(\pi Dl)v \quad (1)$$

where k is a constant that depends upon the stator current-conductor product and magnetic field density, D is the stator bore diameter, l is the length of the stator lamination stack, $\omega_m$ is the rotational speed, and v is the rotor peripheral speed. The term $\pi Dl$ in the right side of (1) is the surface area of a cylinder that fits into the stator bore diameter with length equal to the stator lamination stack, or it is the footprint of the area across which the magnetic field passes from the rotor to the stator.

It is apparent from (1) that if the bore diameter (D) of an electric machine is increased with l and v held constant, the power rating increases directly with D. For a particular power rating and speed v, the machine needs a total specific stator bore magnetic footprint given by $\pi Dl$; however, a contiguous footprint area is not necessary. Further, if the rotor peripheral speed is increased, the power rating increases directly with velocity. The segmented arc generator described herein capitalizes on these observations to produce a generator better suited for the wind generator than the present state-of-the-art approach that simply couples a conventional rotor generator to the propeller shaft.

Figure 1:
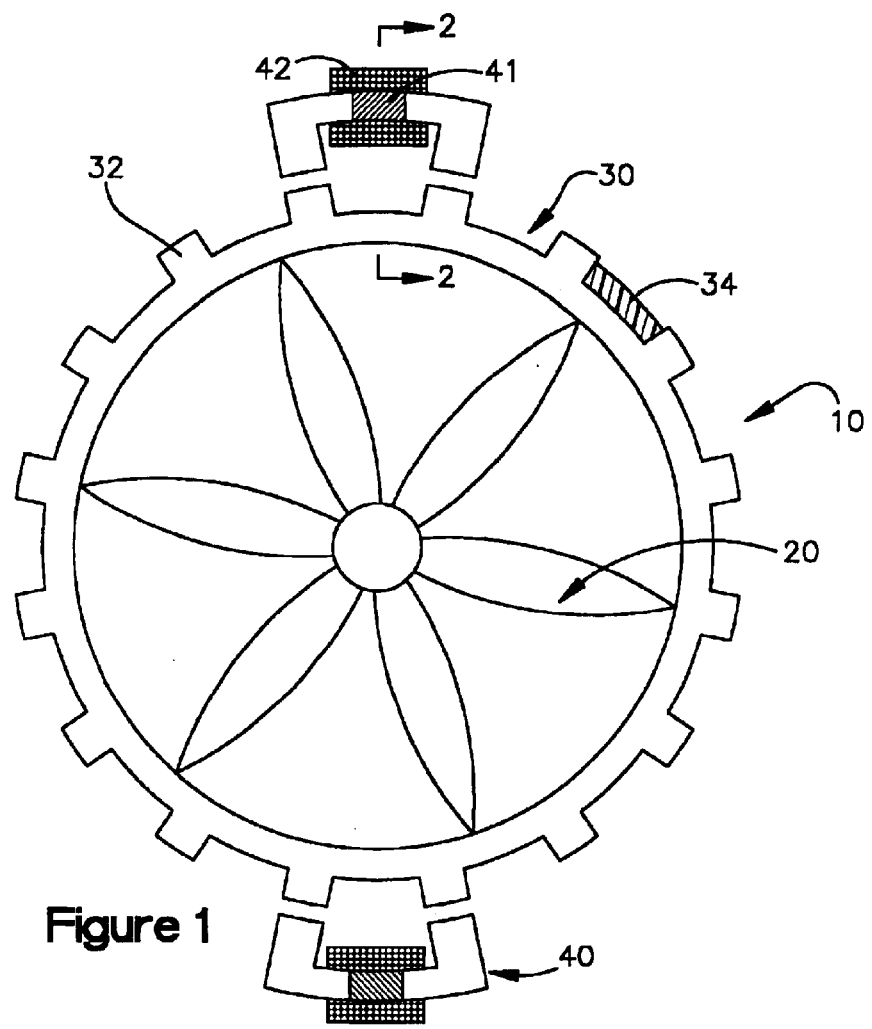
FIG. 1 is an axial view of a segmented arc generator constructed in accordance with an embodiment of the present invention.

FIG. 1 shows an axial view of a wind driven segmented arc generator module 10 constructed in accordance with the present invention. A plurality of stator segments 40 are spaced around the periphery of a rotor 30. Each stator segment includes a permanent magnet 41 encased in a stator coil 42. The rotor 30 has a plurality of salient rotor poles made of magnetic material 32 distributed about its periphery. Nonmagnetic filler material 34 is located between the rotor poles 32 to isolate the poles from one another and cut down on windage effects. A blade assembly 20 is connected to and drives the rotor 30 in response to wind. Each stator segment 40 has another stator segment located diametrically opposite to offset the radial attractive force established by the magnetic fields of the permanent magnets and stator coils. The number of stator segment pairs installed depends upon the desired maximum power rating of the wind generator. By positioning both the coils and the permanent magnets in the stationary stator, rather than the rotor, the generator module can operate at higher rotor speeds and require fewer expensive permanent magnets.

Figure 2:
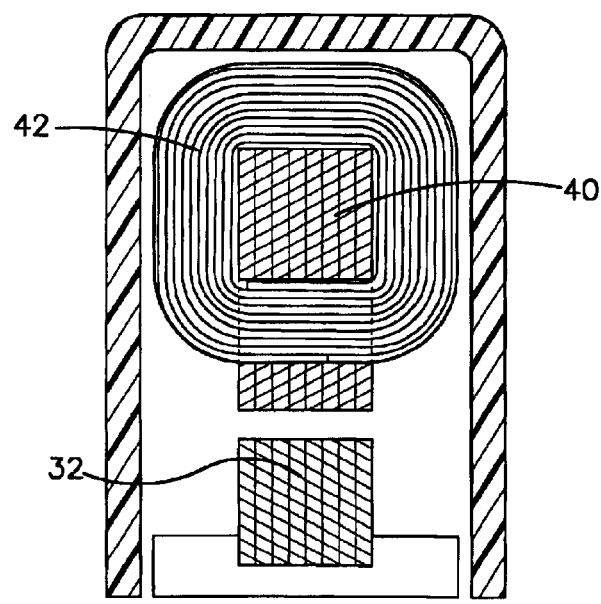
FIG. 2 is a view taken across line 2—2 of FIG. 1.

FIG. 2 is a view to clarify the position and shape of the stator coil 42 and the laminated construction of the stator segment 42 and rotor poles 32. The magnetic field of the stator section does not reverse, but rather it pulsates from a minimum value when opposing poles are unaligned to a maximum value for pole alignment. The flux seen by the stator coil will closely approach a triangular wave with respect to time. Consequently, the voltage induced behind each stator coil will be a quasi-square wave.

FIG. 3 presents a power conditioning process and control for a wind driven segmented arc generator module 10 of the present invention. The stator coils 42 are connected in a series-parallel arrangement as dictated by the desired system output voltage. The phase-controlled converter 51 is a thyristor-based full-wave rectifier. Since the magnitude of the voltage generated by the stator coils varies with propeller speed, the thyristor phase delay angle is controlled to maintain a constant dc link voltage ($V_d$) at the three-phase inverter input 55. The L-C filter formed by inductor 53 and capacitor 54 is necessary to remove the ripple of the phase-controlled converter output voltage so that $V_d$ is a smooth dc waveform suitable for input to the inverter. For the anticipated power and voltage levels, the three-phase inverter 55 will be a transistor-based device operated under PWM control. A wide-band filter 57 is installed at the inverter output to remove the high-frequency components associated with the carrier frequency so that the final system output voltage has negligible harmonic distortion.

The magnitude of inverter output voltage ($V_{ab}$) is determined by control of the inverter modulation index (MI). The phase relationship (δ) of the output voltage to the voltage of the connecting power grid ($V_{AB}$) is determined by the signal level reference sinusoidal voltage of the inverter. With both magnitudes and phase angle control of the inverter output voltage available, a control algorithm can easily be established to control both the reactive and average power supplied to the connected utility grid. This control algorithm can be developed to consider the propeller speed ($\omega_m$) to assure that output power command never exceeds the power available from the propeller for energy conversion.

Advantages of the disclosed wind driven generator include low maintenance cost, the ability to handle extreme high wind conditions, the ability to generate power at low wind speeds, an increase in power generation at any given wind speed, and a lower cost per kilowatt than current commercial state-of-art technology. In addition, the majority of the structural parts can be produced using a Vartim or Resin Transfer Molding (RTM) system.

The disclosed generator can be used in residential markets in the 1.5–10 kW size range. There are a large number of discrete customers that can use a 1.5 kWm–10 kW wind powered generator. Federal and State tax incentives or purchase incentives are available for small wind powered generators. For example, the State of California provides a 50% case rebate for qualified purchases of small wind systems up to 10 kW. Illinois provides up to a 50% grant for installing a wind energy system with peak power greater than 10 kW. Other states are in the process of developing similar incentives. The disclosed wind powered generator can also be used to produce utility-grade machines in the 500–1,000 kW range.

Figure 4:
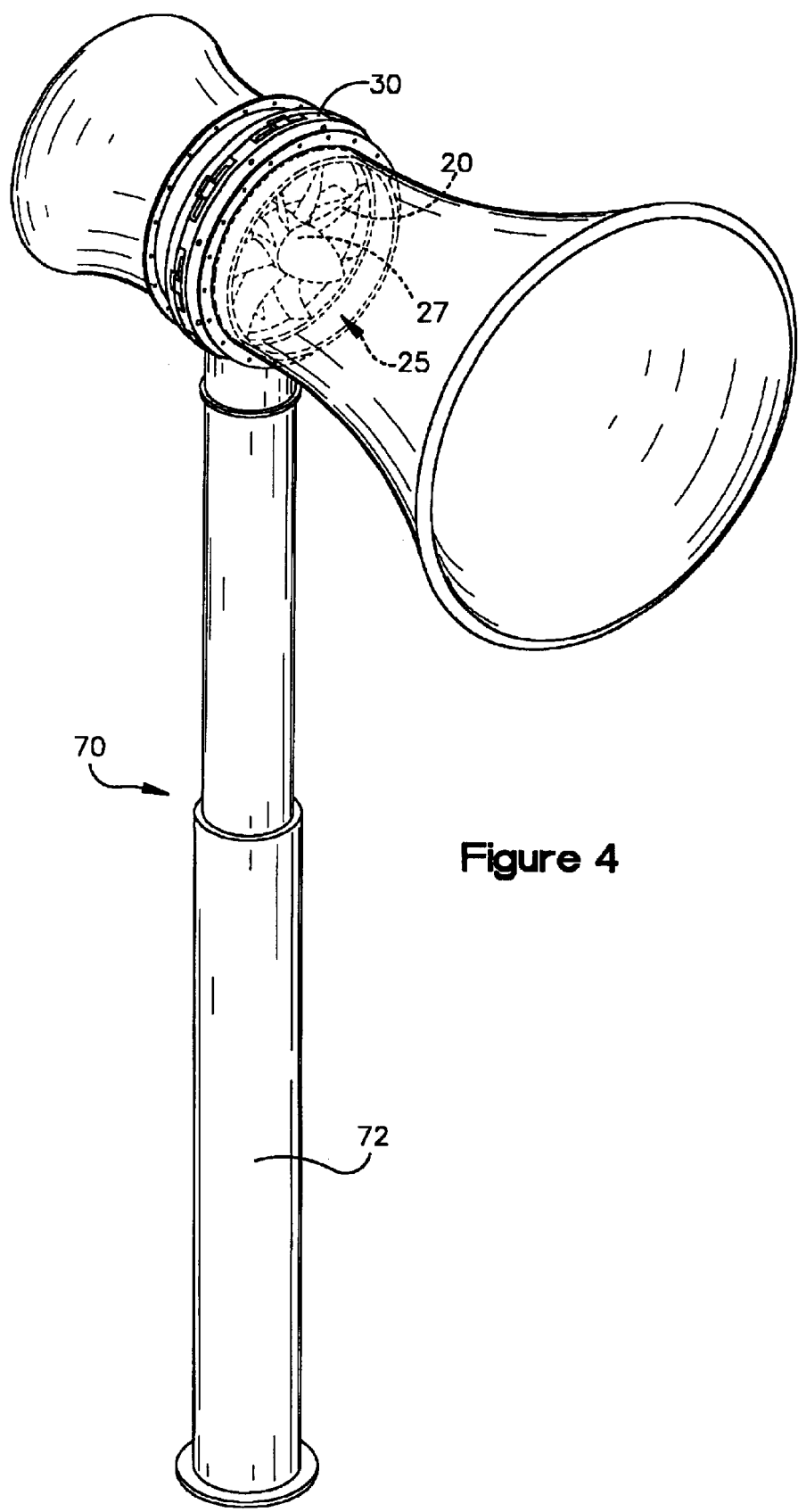
FIG. 4 is a perspective view of a wind driven electric generator assembly constructed in accordance with an embodiment of the present invention.

FIG. 4 is an overall view of a wind driven arc segmented generator assembly 70 as installed in the field. Support structure 72 anchors the generator assembly 70 to the ground and positions a wind collector assembly 25 above the ground to maximize exposure to wind. The wind collector assembly 25 serves as the intake for a plurality of arc segmented generator modules 30 described above. Wind positioning equipment (not shown) may rotate the wind collector assembly to an optimal position for receiving wind or to for preventing damage in high wind conditions.

Figure 12:
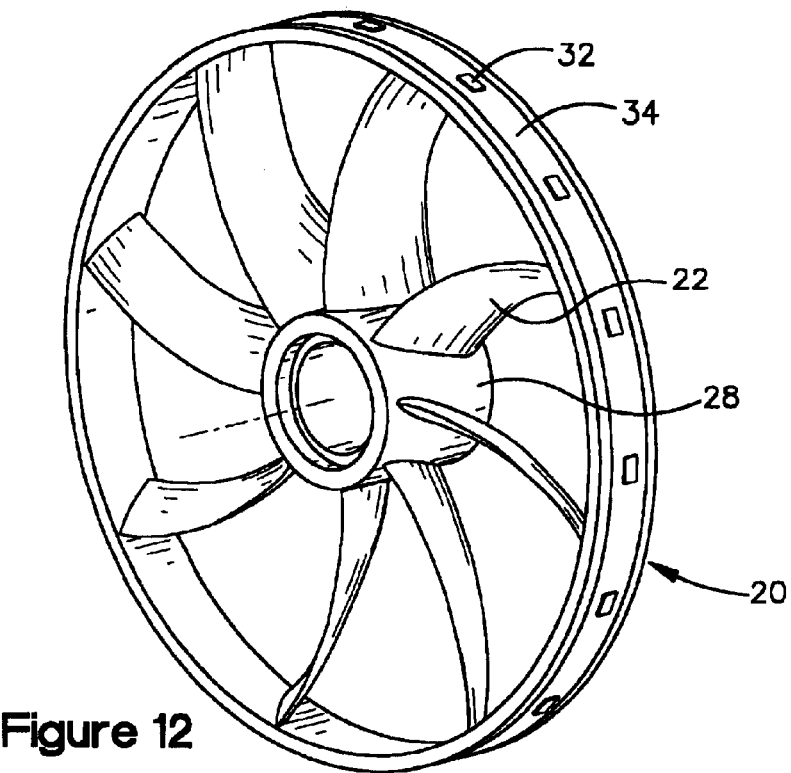
FIG. 12 is a perspective view of a blade assembly for use in a wind driven segmented arc generator constructed in accordance with an embodiment of the present invention.
Figure 13:
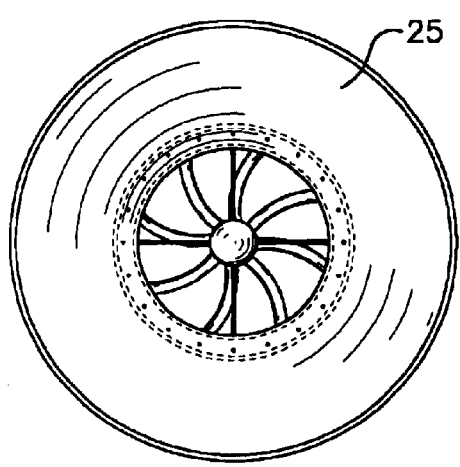
FIG. 13 is a front elevation view of a static structure assembly for use in a wind driven segmented arc generator constructed in accordance with an embodiment of the present invention.
Figure 14:
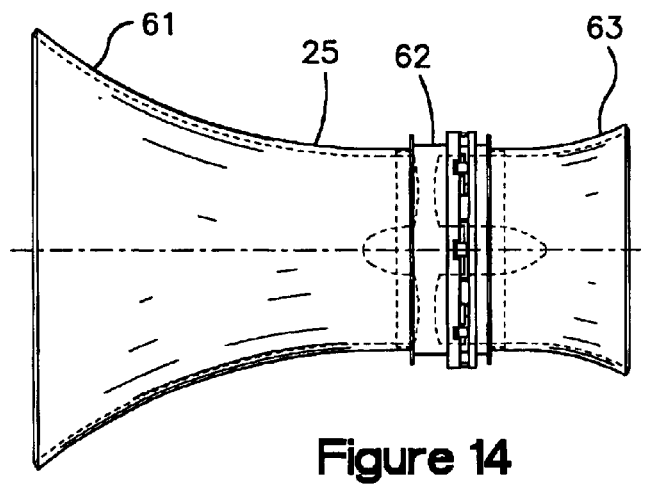
FIG. 14 is a side elevation view of a static structure assembly for use in a wind driven segmented arc generator constructed in accordance with an embodiment of the present invention.

Referring now to FIGS. 5 and 6, a pair of arc segmented generator modules 10 are shown as assembled together in series for use in a single wind driven arc segmented generator assembly. Depending on the desired output power and wind potential, any number of arc segmented generator modules 10 can be used. A protective flange 61 that protects the rotor 30 and stator segments 40 is shown in FIG. 5 and removed in FIG. 6. FIGS. 7, 8, and 9 show further details about the arc segmented generator module. FIG. 8 is a cross section view of a turbine blade 22 and its connection to a hub 28 within the arc segmented module. A hub cover 23 protects a spindle 29 and other components that allow the blade assembly 20 to rotate freely. Forward and aft flange rings are indicated at 25, 26 . FIGS. 10 through 14 provide additional views of the arc segmented generator module including a cross sectional view shown in FIG. 11. FIG. 12 shows the blade assembly 20 in detail including the rotor poles 32 surrounded by the non-metallic material 34. In another embodiment, simple support struts replace the turbine blades and the rotor is driven by a fan powered shaft (shown in FIG. 21).

The disclosed wind driven generator can also be used as a motor. Use of the disclosed generator as a motor produces high torque output. A voltage is applied to the outer coils to drive the poles coupled to the blade assembly. In this embodiment, the blades are replaced with supports that offer little wind resistance.

Alternate Embodiment

Figure 15:
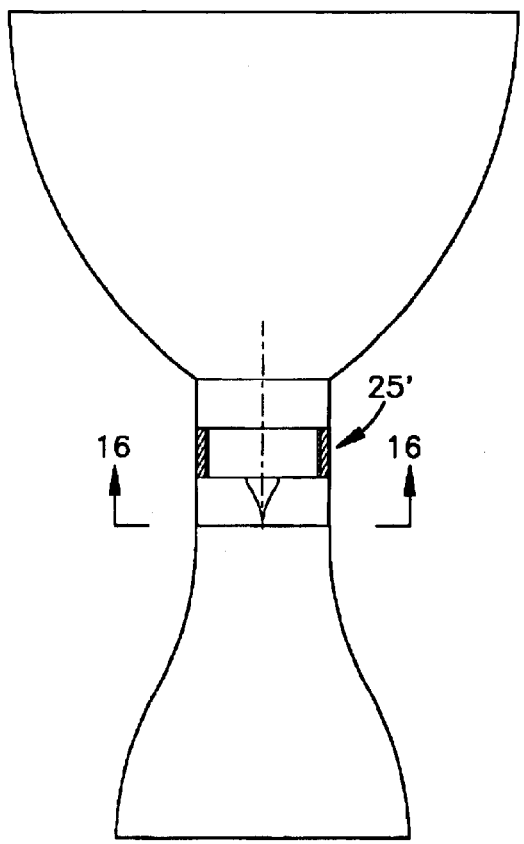
FIG. 15 is a top plan view of a wind driven electric generator of a second embodiment coupled to a wind collector.
Figure 16:
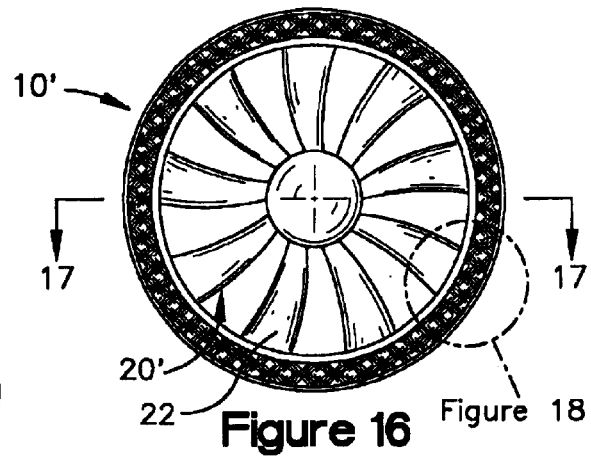
FIG. 16 is a front plan view of a wind driven electric generator of the second embodiment.
Figure 17:
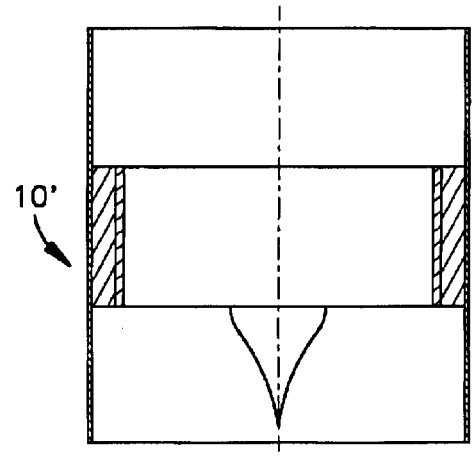
FIG. 17 is an enlarged view of a wind driven electric generator of the second embodiment.
Figure 18:
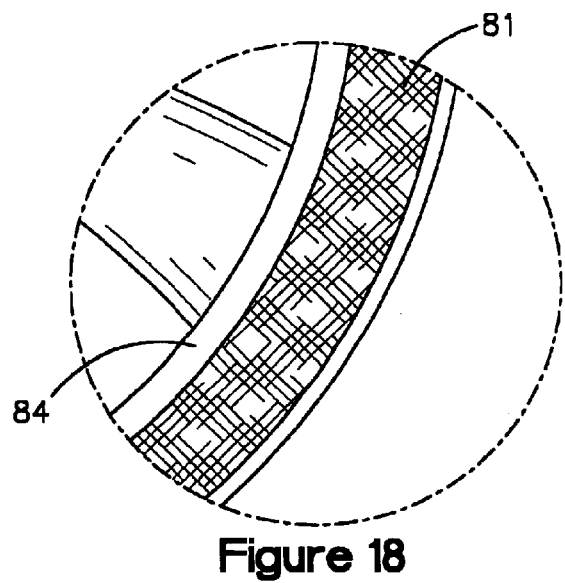
FIG. 18 is an enlarged sectional view depicting a portion of FIG. 16.

One embodiment of the invention is illustrated by FIGS. 15–18. This embodiment is suitable for generating power from wind by utilizing some of the same design features that are used in turbo-fan engine construction. In this embodiment, the wind generator uses the basic fan design of a turbo-fan engine as the configuration for a variable frequency generator. FIG. 15 shows the wind collector 25' including an inlet nozzle, throat section that houses the arc segmented generator modules, and an exit nozzle. A fan assembly 20' (FIG. 16) is mounted within a casing with very close tolerances between the fan tips and the casing side. Embedded along the blade tips of the fan are windings 84 (FIG. 18) that act as rotor windings do on a conventional generator. Additional windings 81 are embedded within the outside casing that the fan 20' is rotating in. The additional windings 81 act as the stator of the generator. Thus, the rotating fan tip windings 84 within the case in conjunction with the outside case windings act as a generator. The unit has a variable frequency control feature that maintains constant voltage all through the designed RPM range. Additional features are for the blades 22 (FIG. 16) of the fan to be variable so as to take advantage of the best blade angle of attack over changing wind speeds. Variable blades are achieved through an active drive or mechanical force. An additional feature is the mounting of a wind collector 25' to the intake of the generator. The collector 25' is a funnel that increases the amount of air that is forced through the generator.

Alternate Embodiment

Figure 19:
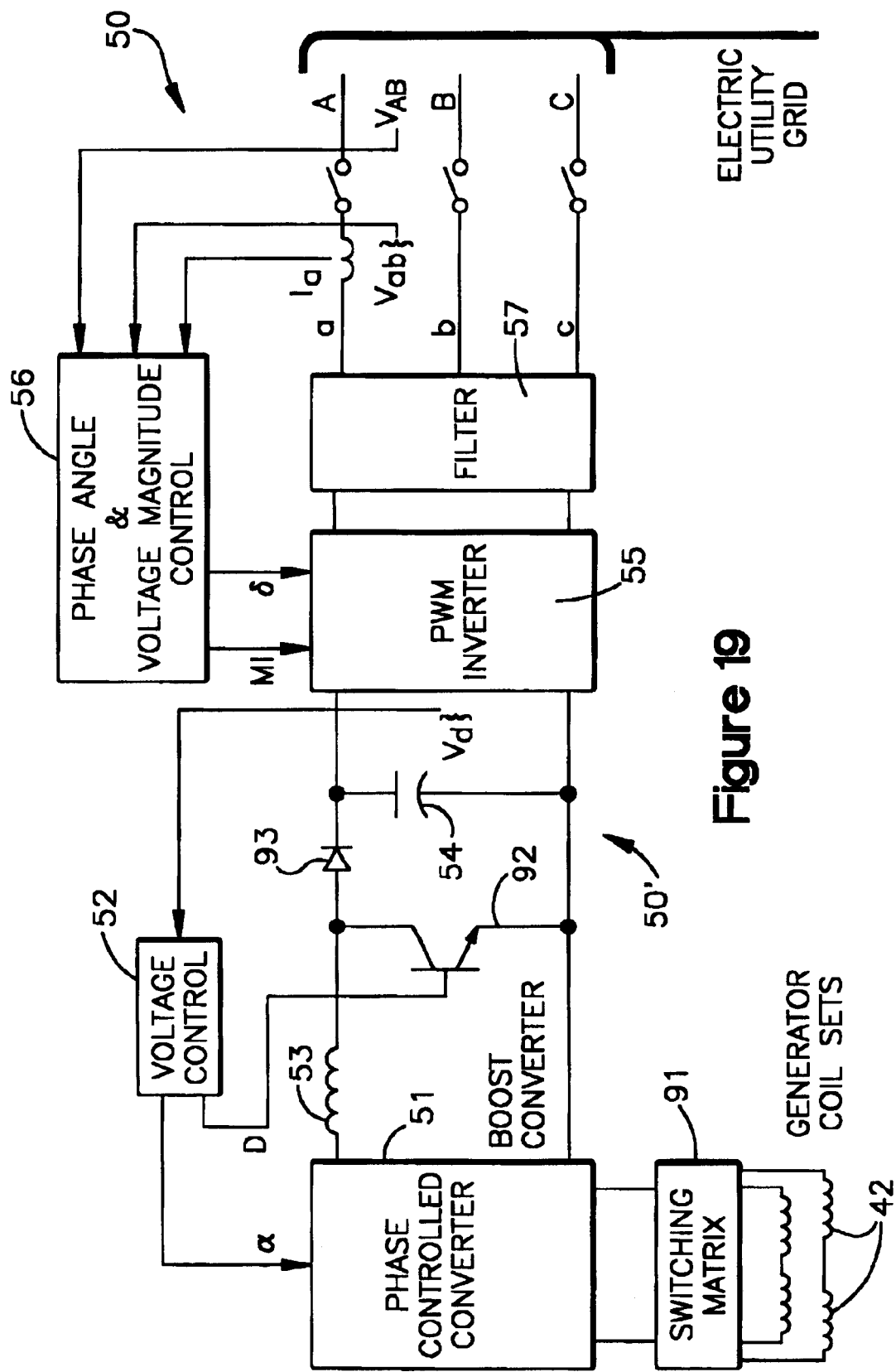
FIG. 19 is a schematic for a power conditioning circuit constructed in accordance with an embodiment of the present invention.
Figure 20:
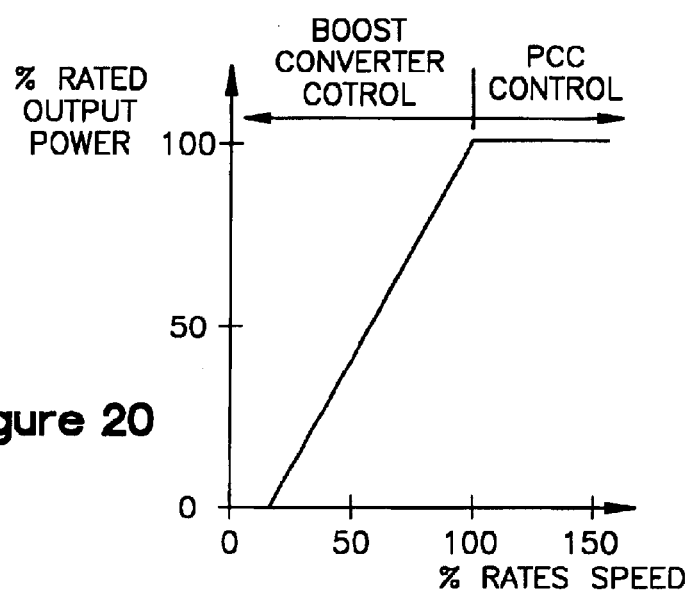
FIG. 20 is a graph showing power output of a wind driven segmented arc generator constructed in accordance with an embodiment of the present invention.
Figure 21:
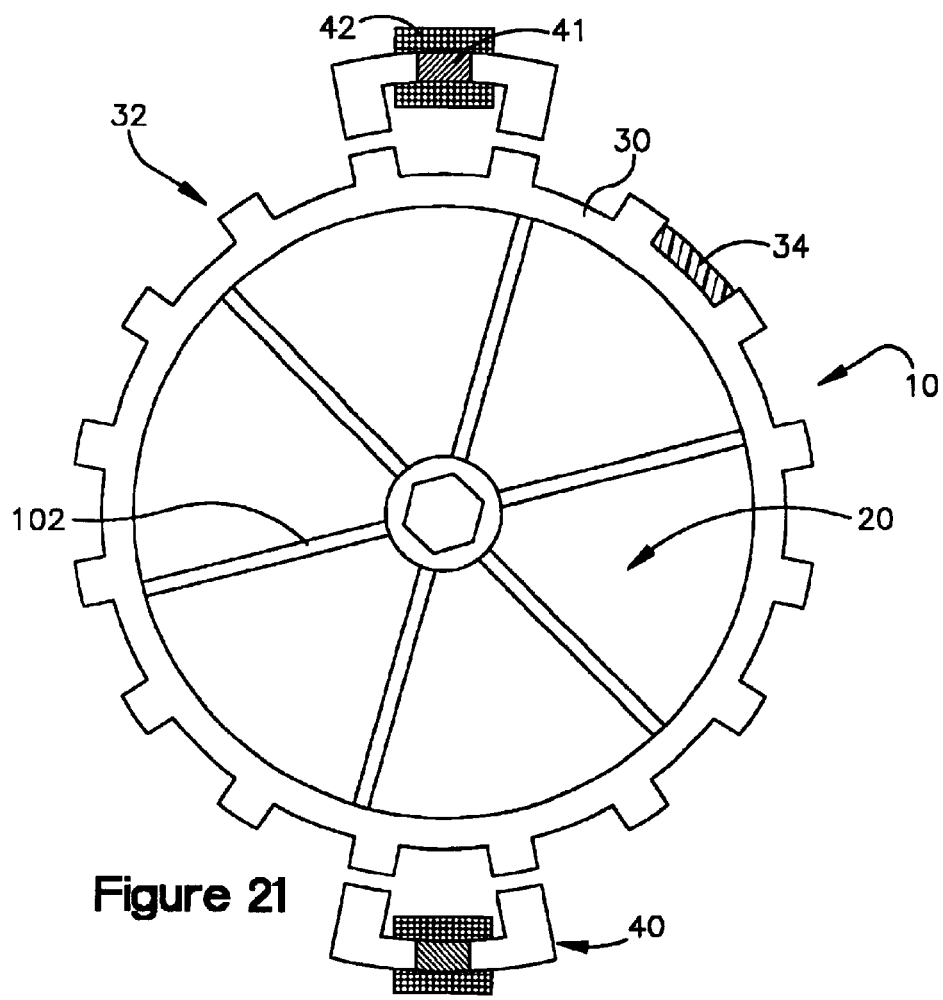
FIG. 21 is an illustration of a segmented arc generator constructed in accordance with an embodiment of the present invention.

FIGS. 19–21 illustrate a segmented arc generator that is adapted for use at both low and high fan speeds. In this embodiment, the rotor poles are mounted on an inner rotating rotor assembly similar to the ones depicted in previous drawings except that rather than including fan blades that are driven by the wind within the rotor assembly, the rotor assembly has simple "spider" support structure to maintain the air gap between the outer rim and the stator coils as shown in FIG. 21 reference character 102. In this embodiment, the rotor assembly is rotated by a shaft that is powered by a fan driven by the wind. In addition, this embodiment can be practiced with mechanical power provided by water or any other source. As already described, the rotor/stator pairs are modularized as generator modules that can be placed in a "stack" on a single shaft to increase power output. The generator modules have numerous features and a specialized power conditioning circuitry that make them operate efficiently through a broad range of wind speeds.

FIG. 19 is a schematic representation of a power conditioning circuit that enables the generator modules to operator efficiently at a wide range of fan speeds. The stator coils 42 provide unconditioned quasi-square wave voltage to the circuit to be rectified and filtered. The resulting D.C. voltage is transformed by the inverter into A.C. voltage suitable for connection to an electric utility grid also shown on FIG. 19.

A switching matrix 91 is employed to selectively connect the generator coil sets 42 in series or parallel or a combination of series and parallel connections. The multiple stator segment pairs 42 are connected in a series connection via the switching matrix 91 to permit an increase in the terminal voltage so that the generator can produce output power at low values of fan speed. At high fan speeds, the switching matrix places the coil sets in parallel to take advantage of the larger voltage induced in each coil and thereby increasing the power output rating of the generator. As wind conditions change, the stator coils are automatically connected in a series-parallel arrangement by the switching matrix 91. In addition to selectively placing the coils in series or parallel arrangement, the switching matrix may also selectively connect or disconnect coils from operation to further optimize generator performance as a function of fan speed.

The stator segment pairs are circumferentially indexed so as to produce an output voltage waveform favorably suited to yield a low-ripple rectified dc voltage to the phase-controlled converter 51 which is a thyristor-based full-wave rectifier. A voltage controller 52 monitors $V_d$, which is an approximately constant D.C. voltage that results from conditioning of the quasi-square wave coil voltage through the phase controlled converter and boost converter. Based on the monitored value of $V_d$, the voltage controller 52 controls the phase delay angle of the output of the phase controlled converter as designated by input α. For example, to increase the magnitude of $V_d$, the voltage controller passes a value of α that results in a larger portion of the input voltage of the coil voltage being output by the phase controlled converter.

In addition to controlling the phase controlled converter, the voltage controller 52 controls a boost converter circuit that increases the rectified generator output voltage at lower fan speeds. The boost converter circuit is made up of the inductor 53, the transistor 92, the diode 93, and the capacitor 54. For lower speed operation, the phase-controlled converter 51 is controlled with zero phase delay and the boost converter is controlled to act as a variable transformer that maintains the required value of $V_d$. At low fan speed, $V_d$ will drop off. When $V_d$ falls to below a predetermined level, the voltage controller 52 will periodically pulse a gate voltage to the boost transistor 92. When the transistor is on, the inductor 53 is charged because the diode 93 will not conduct. When the voltage controller turns the transistor 92 off, the diode 93 conducts and the inductor 53 discharges to provide a pulse of "boosted" voltage as $V_d$.

For the higher speed conditions, the boost converter transistor that is connected in parallel with the input to the PWM inverter 55 is maintained in the OFF state by voltage control 52 and the inductor 53 and capacitor 54 form a filter to remove the ripple of the phase controlled converter output voltage so that $V_d$ is a smooth dc waveform suitable for input to the inverter. Since the magnitude of the voltage generated by the stator coils varies with fan speed, the thyristor phase delay angle is controlled via the voltage controller 52 to maintain a constant dc link voltage ($V_d$) at the inverter 55 for operation near and above rated speed.

For the anticipated power and voltage levels, the three-phase inverter 55 will operated under PWM control, and may be transistor based. A wide-band filter 57 is installed at the inverter output to remove the high-frequency components associated with the carrier frequency so that the final system output voltage has negligible harmonic distortion. The magnitude of inverter output voltage ($V_{ab}$) is determined by control of the inverter modulation index (MI). The phase relationship (δ) of the output voltage to the voltage of the connecting power grid ($V_{AB}$) is determined by the signal level reference sinusoidal voltage of the inverter. With both magnitudes and phase angle control of the inverter output voltage available, a control algorithm can easily be established to control both the reactive and average power supplied to the connected utility grid. This control algorithm can be developed to consider the fan speed ($\omega_m$) to assure that output power commanded never exceeds the power available from the propeller for energy conversion.

FIG. 20 displays the profile of output power vs. speed produced by the generator and cascaded power conditioner of FIG. 19. Through use of a series stator coil connection by the switching matrix and voltage step-up by the boost converter, the extraction of output power can begin at 10% or less of rated speed. The output power for continuous operation above rated speed is limited to the rated value due to current heating.

Although the present invention has been described with a degree of particularity, it is the intent that the invention include all modifications and alterations from the disclosed design falling within the spirit or scope of the appended claims.

We claim:

1. A segmented arc generator for converting mechanical power into electrical power comprising:
   a) a rotor comprising a plurality of salient poles disposed about a periphery of a rotor ring that comprises a support structure for maintaining the radial position of the salient poles when the rotor rotates as a result of being driven by a prime mover;
   b) a stator comprising a stator ring disposed radially about and in close proximity to the rotor ring, the stator ring comprising a plurality of stator coils wound on a ferromagnetic structure and having permanent magnets imbedded within the structure, and wherein relative motion between a rotor pole and a corresponding stator coil induces a coil voltage across that coil;
   c) a phase controlled converter in electrical communication with the stator coils for rectifying an output voltage of the coil by passing a variable portion of the coil voltage to approximate a D.C. voltage, and wherein a voltage controller monitors the D.C. voltage and controls the phase controlled converter to pass a portion of the coil voltage that maintains a relatively constant D.C. voltage;
   d) a pulse width modulated inverter in electrical communication with the phase controlled converter for converting the D.C. voltage output by the phase controlled converter to an A.C. voltage of controlled amplitude and phase relationship determined with respect to a voltage waveform present on a connected utility grid; and
   d) a switching matrix for selectively placing the coils in series or parallel or a combination of series and parallel connections with respect to one another in response to control signals that are based on present operating conditions of the generator.

2. The generator of claim 1 comprising a boost converter circuit for providing and maintaining a minimum D.C. voltage to the pulse width modulated inverter when the voltage induced in the coils falls below a threshold value.

3. The generator of claim 2 wherein the boost converter circuit comprises a storage device that is activated by a switch to selectively store and discharge energy to the pulse width modulated inverter.

4. The generator of claim 2 wherein the boost converter circuit comprises an inductor connected in series with the output of the phase controlled converter, a transistor connected by its collector to the inductor and by its base to ground, and a diode connected between the collector and the input of the pulse width modulated inverter and wherein the voltage controller provides gate voltage pulses to the transistor of controlled duration when the D.C. voltage falls below a predetermined level to periodically charge and discharge the inductor to supply a D.C. voltage of increased magnitude to the pulse width modulated inverter.

5. The generator of claim 1 wherein the switching matrix removes stator coils from operation based on generator operating conditions.

6. The generator of claim 1 wherein the rotor support structure comprises integrally formed fan blades that rotate when acted upon by the wind to rotate the rotor within the stator.

7. The generator of claim 1 wherein the prime mover is a fan driven shaft.

8. The generator of claim 1 comprising a plurality of rotor and stator pairs.

9. A method for converting mechanical power from a rotating shaft to electrical power supplied to a utility grid, the method comprising the steps of:
   a) rotating a rotor comprising a plurality of salient poles distributed peripherally about a rotor ring within a surrounding stator ring comprising a plurality of stator coil assemblies each comprising a stator coil wound about a ferromagnetic structure and a permanent magnet imbedded in the ferromagnetic structure to induce a quasi-square wave coil voltage across the stator coils;
   b) selectively connecting the stator coils in either in parallel or series or a combination of series and parallel connections with respect to one another in response to control signals that are based on present operating conditions of the generator;
   c) converting the quasi-square wave coil voltage to a relatively constant D.C. voltage by passing a variable portion of the coil voltage to approximate a D.C. voltage; and
   d) selectively inverting the D.C. voltage to create a pulse width modulated voltage of controlled amplitude a phase relationship determined with respect to a voltage waveform present on a connected utility grid.

10. The method of claim 9 comprising the step of monitoring the D.C. voltage and activating a boost circuit when the D.C. voltage falls below a threshold value.

11. The method of claim 10 wherein the step of activating a boost circuit is performed by activating a switch for controlled durations to cause a storage device to charge and then discharge a D.C. voltage of increased magnitude to the pulse width modulator.

12. The method of claim 10 wherein the step of activating a boost circuit is performed by providing a control signal to a gate of a switching transistor to periodically charge and discharge an inductor to supply a D.C. voltage of increased magnitude to the pulse width modulated inverter.

13. The method of claim 9 comprising the step of selectively deactivating stator coils based on present generator operation conditions.

* * * * *